United States Patent
Hernandez et al.

(10) Patent No.: US 9,520,822 B2
(45) Date of Patent: Dec. 13, 2016

(54) CIRCUITS AND METHODS FOR DRIVING ECCENTRIC ROTATING MASS MOTORS

(71) Applicant: Texas Instruments Incorporated, Dallas, TX (US)

(72) Inventors: David Hernandez, Dallas, TX (US); Mayank Garg, Murphy, TX (US); David J. Baldwin, Allen, TX (US); Brandon James Beckham, Acton, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 115 days.

(21) Appl. No.: 13/871,191

(22) Filed: Apr. 26, 2013

(65) Prior Publication Data
US 2014/0320045 A1  Oct. 30, 2014

(51) Int. Cl.
*H02P 7/29* (2016.01)
*H02P 25/02* (2016.01)
*H02P 6/18* (2016.01)
*G06F 3/00* (2006.01)

(52) U.S. Cl.
CPC ............. *H02P 25/027* (2013.01); *H02P 6/182* (2013.01); *H02P 25/032* (2016.02)

(58) Field of Classification Search
USPC ........................................................ 318/114
See application file for complete search history.

(56) References Cited

U.S. PATENT DOCUMENTS

| | | | | |
|---|---|---|---|---|
| 5,223,772 A | * | 6/1993 | Carobolante | H02P 6/205 318/400.11 |
| 2002/0126432 A1 | * | 9/2002 | Goldenberg | G06F 3/016 361/103 |
| 2003/0025595 A1 | * | 2/2003 | Langberg | 340/407.1 |
| 2003/0034704 A1 | * | 2/2003 | Kikuchi | H02P 6/182 310/81 |
| 2006/0290304 A1 | * | 12/2006 | Marcinkiewicz | H02P 21/141 318/432 |
| 2008/0037164 A1 | * | 2/2008 | Oh | G11B 17/028 360/99.08 |
| 2008/0278101 A1 | * | 11/2008 | Shahi et al. | 318/400.11 |
| 2012/0038297 A1 | * | 2/2012 | Lee | H02P 6/20 318/400.11 |
| 2012/0229264 A1 | * | 9/2012 | Company Bosch | G06F 3/016 340/407.1 |
| 2013/0194084 A1 | * | 8/2013 | Lacroix | G06F 3/016 340/407.1 |

* cited by examiner

*Primary Examiner* — Paul Ip
*Assistant Examiner* — Said Bouziane
(74) *Attorney, Agent, or Firm* — Gregory J. Albin; Frank D. Cimino

(57) ABSTRACT

Circuits and methods for driving ERM motors are disclosed herein. An embodiment of the circuit includes an input, wherein an input signal is receivable at the input and a back EMF signal. The circuit operates in a closed loop mode when the back EMF signal is less than a lower threshold value and the difference between the value of the input signal and the back EMF signal indicates that the velocity of the motor needs to increase. The circuit operates in an open loop mode when the back EMF signal is greater than a high threshold value and the difference between the value of the input signal and the back EMF signal indicates that the velocity of the motor needs to increase.

12 Claims, 2 Drawing Sheets

CIRCUITS AND METHODS FOR DRIVING ECCENTRIC ROTATING MASS MOTORS

BACKGROUND

Eccentric rotating mass (ERM) motors provide tactile feedback to a user of a device using an ERM motor by providing a shake or vibration that the user can feel. ERM motors may be used in cellular telephones to produce a vibration instead of an audible signal that notifies the telephone user of an event, such as an incoming call. An ERM motor spins a weight that is offset from an axis of rotation, which causes the ERM motor to shake or vibrate.

The ERM motors are driven by ERM drivers. In order to control the velocity or angular frequency of the motors, the drivers may operate in a closed loop mode. The closed loop mode uses a back electromechanical force (BEMF) voltage as the feedback signal. The BEMF contains a voltage proportional to the angular frequency of the motor and a ripple that can be significant depending on the motor construction. The ripple in the feedback signal propagates to the ERM driver causing undesired driving fluctuations. A filter can be inserted in the feedback path to attenuate the ripple; however, the filter introduces new poles in the gain of the feedback path, which degrade the stability of the motor.

SUMMARY

Circuits and methods for driving ERM motors are disclosed herein. An embodiment of the circuit includes an input, wherein an input signal is receivable at the input and a back EMF signal. The circuit operates in a closed loop mode when the back EMF signal is less than a lower threshold value and the difference between the value of the input signal and the back EMF signal indicates that the velocity of the motor needs to increase. The circuit operates in an open loop mode when the back EMF signal is greater than a high threshold value and the difference between the value of the input signal and the back EMF signal indicates that the velocity of the motor needs to increase.

DETAILED DESCRIPTION

Drivers for eccentric rotating mass (ERM) motors and methods of driving ERM motors are disclosed herein. ERM motors provide tactile feedback to a user of a device using an ERM motor by providing a shake or vibration that the user can feel. ERM motors may be used in cellular telephones to produce a vibration instead of an audible signal that notifies the telephone user of an event, such as an incoming call. An ERM motor spins a weight that is offset from an axis of rotation, which causes the ERM motor to shake or vibrate.

Figure 1:
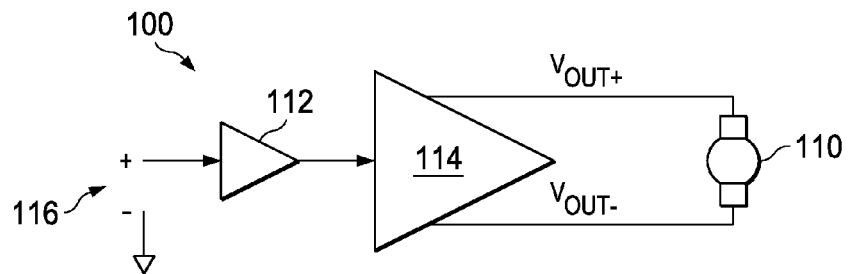
FIG. 1 is an embodiment of an eccentric rotating mass motor driver operating in an open loop mode according to the prior art.

The frequency of the vibration is related to the angular frequency or velocity of the ERM motor, which is controlled by an ERM driver. The ERM motors can be driven by ERM drivers that operate in an open loop mode or a closed loop mode. Prior art FIG. 1 is a schematic illustration of a driver circuit 100 that drives an ERM motor 110 (referred to herein simply as a motor) in an open loop mode. The circuit 100 includes the motor 110, an input amplifier 112, and an output driver 114. The circuit 100 receives an input voltage that is sometimes referred to as an input signal, at an input 116. The input voltage is proportional to a user selected angular frequency or velocity of the motor 110. For example, the input voltage may have a value of between zero and one. A zero value or a low value at the input 116 may be indicative of the user wanting the motor 110 to stop. A value of one may be indicative of the user wanting the motor 110 to operate at its highest velocity, which is sometimes referred to as the full scale velocity. A value of 0.5 may be indicative of a user wanting the motor 110 to rotate at half of its highest velocity.

The input 116 is connected to the input amplifier 112. The output of the input amplifier 112 is connected to the input of the output driver 114. The output driver 114, and thus the circuit 100, outputs a voltage to the motor 110 which is proportional to the desired velocity of the motor 110. The voltage output by the output driver 114 may be a differential voltage as shown by the voltages $V_{OUT+}$ and $V_{OUT-}$.

The circuit 100 operates without any feedback, which is referred to as an open loop mode. The gain of the input amplifier 112 may be fixed and may be small, which limits the acceleration of the motor 110. The operation of the circuit 100 is very simple in that the input voltage is amplified by the input amplifier 112 and output to the output driver 114. In some embodiments, the input amplifier 112 has a gain of one and serves as a buffer between circuits driving the input 116 and the motor 110. In summary, the circuit 100 receives the input voltage and outputs a voltage to the motor 110 that should cause the motor to spin at an angular frequency that is proportional to the input voltage.

Figure 2:
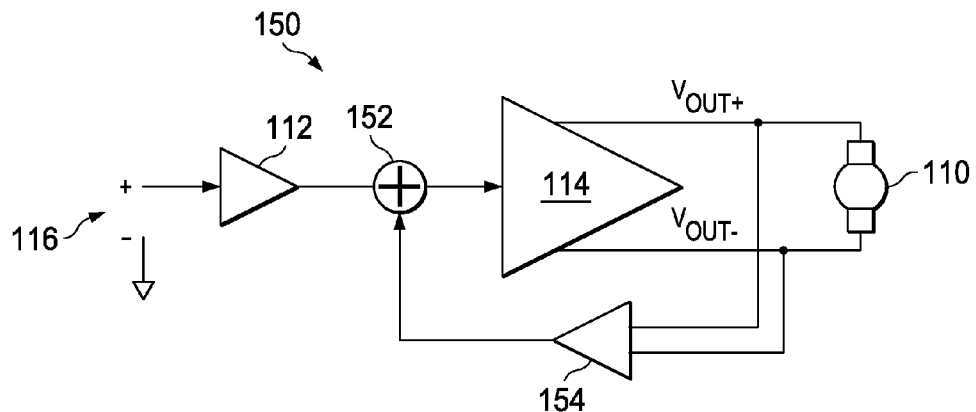
FIG. 2 is an embodiment of an eccentric rotating mass motor driver operating in a closed loop mode according to the prior art.

An example of a circuit 150 for driving the motor 110 in a closed loop mode is shown in FIG. 2. The circuit 150 uses the same components as the circuit 100 with the addition of a summer 152 and a feedback amplifier 154. The summer 152 adds the signal or voltage output from the input amplifier 112 to the signal or voltage from the feedback amplifier 154 and outputs a drive signal to the output driver 114. The feedback amplifier 154 monitors the back electro-mechanical force (BEMF) of the motor 110 to determine its angular velocity. The BEMF is a voltage generated by the motor 110 that is proportional to the angular velocity of the motor 110.

The desired velocity of the motor 110 is set by the input voltage at the input 116. The voltage from the input amplifier 112 is compared to the BEMF that is output by the feedback amplifier 154. It is noted that the feedback amplifier 154 may output a negative signal which is subtracted by the summer 152 from the voltage output by the input amplifier 112. The result is an error signal that represents the difference between the desired velocity of the motor 110 and the actual velocity of the motor 110. The closed loop operation of the motor 110 provides for greater acceleration of the motor 110 because the velocity of the motor 110 is monitored by the feedback amplifier 154.

One of the problems with the closed loop operation is that the BEMF inherently has ripple. The ripple is dependent on many factors, including the construction and the electrical characteristics of the motor 110, such as the number of poles. The ripple has a frequency that is a multiple of the angular frequency of the motor 110, and may be dependent on other variables associated with the motor 110. The BEMF is received by the feedback amplifier 154 and amplified through the circuit 150. Therefore, a small ripple on the BEMF may be amplified through the circuit 150 and cause a runaway situation where the ripple is continuously amplified, which adversely affects the operation of the motor 110.

Figure 3:
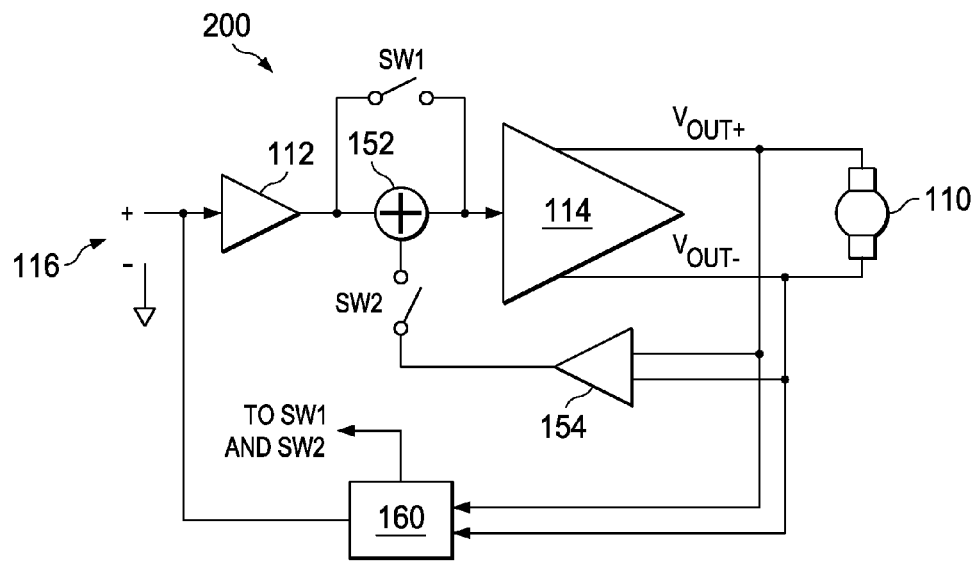
FIG. 3 is an embodiment of an eccentric rotating mass motor driver circuit that operates in both closed loop and open loop modes.

The circuits and methods described herein overcome the problems with driving the motor 110 solely in open loop or closed loop configurations. A schematic diagram of a hybrid circuit 200 that operates in both open loop and closed loop is shown in FIG. 3. It is noted that the circuit 200 may have more components than those shown in FIG. 3. The circuit 200 includes a first switch SW1 and a second switch SW2. The first switch SW1 bypasses the summer 152 and the second switch SW2 connects the feedback amplifier 154 to the summer 152. In operation, the first switch SW1 is open when the second switch SW2 is closed and the first switch SW1 is closed when the second switch SW2 is open. The circuit 200 operates in open loop mode by closing the first switch SW1 and opening the second switch SW2. The circuit 200 operates in the closed loop mode by opening the first switch SW1 and closing the second switch SW2.

The method of driving the motor 110 using the circuit 200 will now be described. A controller 160 monitors the BEMF voltage and the voltage at the input 116. The difference between the voltage at the input 116 and the BEMF voltage represents an error. A positive error means that the motor 110 needs to increase its velocity in order to meet the velocity set by the voltage at the input 116. A negative error means that the motor needs to slow down in order to meet the velocity set by the voltage at the input 116. It is noted that the gain of the circuit 200 varies depending whether it is operated in open loop mode or closed loop mode. In some embodiments, the gain of the input amplifier 112 may vary depending on whether the circuit 200 is operated in the open loop mode or the closed loop mode. It follows that the gain of the circuit 200 will vary depending on the gain of the input amplifier 112.

Two thresholds are established for the circuit 200. A low threshold, $TH_{LO}$, is a value indicating that the circuit 200 needs to provide for a strong acceleration of the motor 110. The low threshold $TH_{LO}$ is equal to or proportional to a low threshold constant $K_{LO}$ multiplied by the voltage at the input 116 and the BEMF full scale value. The BEMF full scale value is the highest BEMF that can be output. The value $K_{LO}$ is a point related to the error between the input voltage and the BEMF where the circuit enters the closed loop mode. A high threshold $TH_{HI}$ is a value indicating that the motor 110 is close to its desired operating speed, so the circuit 200 enters an open loop mode. The high threshold $TH_{HI}$ is equal to or proportional to the voltage at the input 116 multiplied by the full scale BEMF and a high threshold constant $K_{HI}$. It follows that $0<K_{LO}<K_{HI}<1$.

Figure 4:
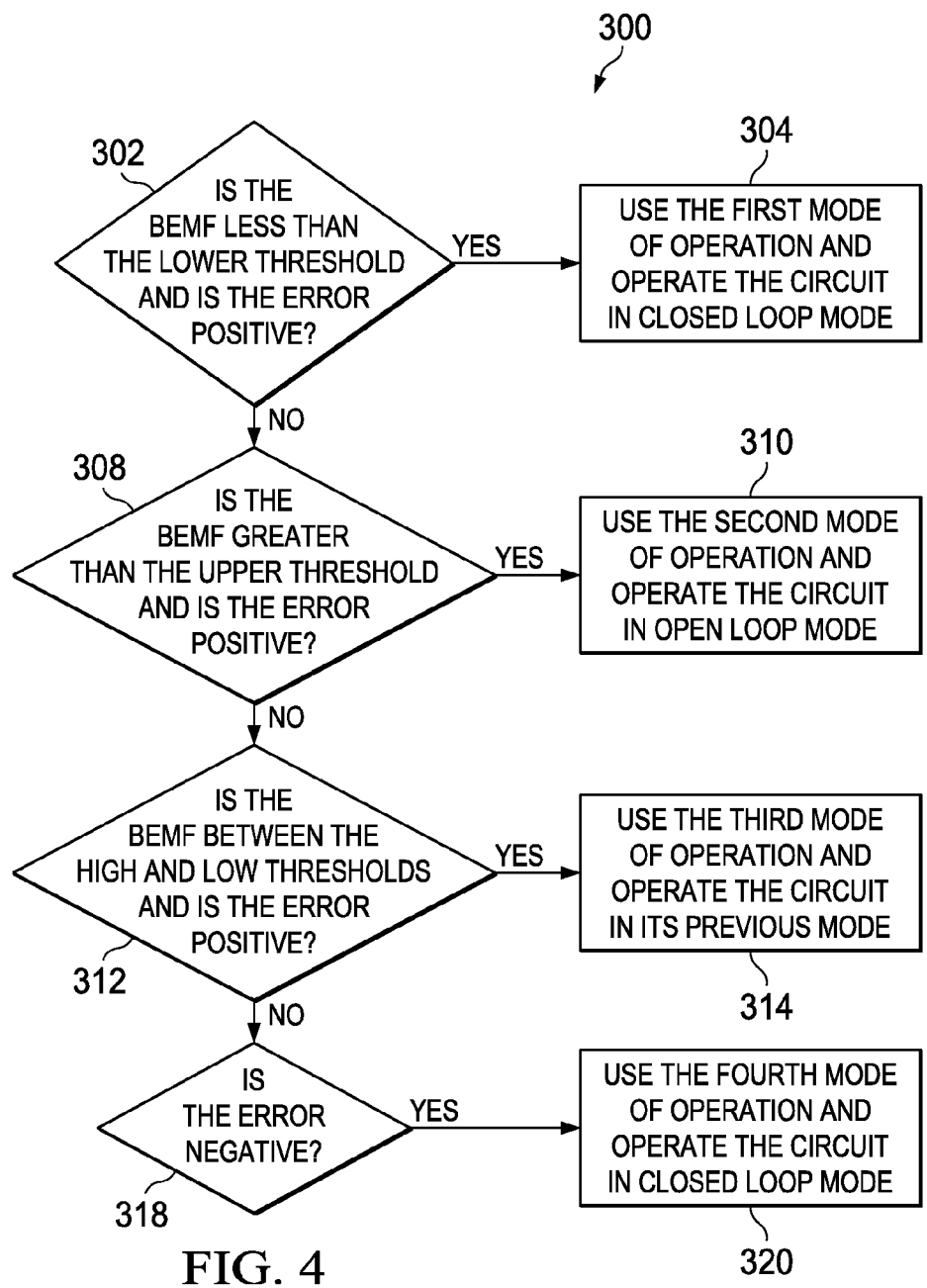
FIG. 4 is a flow chart illustrating the different operating modes of the circuit of FIG. 3.

The circuit 200 has four operating modes that are described below and illustrated in the flow chart 300 of FIG. 4. The controller 160 measures the BEMF and compares it to the thresholds. It is noted that BEMF is used herein, however, the absolute value of the BEMF may be used for the measurements described below. The result of the comparison determines in which mode the circuit 200 will operate. If the measured BEMF is below the threshold $TH_{LO}$ and the error is positive as shown by decision step 302, the velocity of the motor 110 is significantly below where it needs to be based on the input voltage. This mode of operation is sometimes referred to as the first mode of operation. In the first mode of operation, the circuit 200 operates in closed loop mode as shown by the circuit 200 and block 304 wherein the controller 160 opens the first switch SW1 and closes the second switch SW2. In the first mode of operation, the feedback amplifier 154 is active in the circuit 200. It is noted that in the first mode of operation, the ripple on the BEMF will propagate through the circuit 200, but because the circuit 200 is applying a strong acceleration to the motor 110, the ripple will not substantially affect the operation of the circuit 200.

In a second mode of operation, the BEMF is greater than the high threshold $TH_{HI}$ and the error is positive as shown by decision block 308. In this situation, the velocity of the motor 110 is close to the velocity set by the voltage at the input 116. Therefore, the circuit 200 operates in open loop mode as shown by block 310. In open loop mode, the controller 160 closes the switch SW1 and opens the switch SW2 so that the feedback amplifier 154 is not active and the gain of the circuit 200 is based on the gain of the input amplifier 112 and the output driver 114. More specifically, the feedback is removed from the circuit 200 and the gain of the circuit 200 is based solely on the open loop operation. Accordingly the ripple in the BEMF is not propagated through the circuit 200. In the second mode of operation, the velocity of the motor 110 is close to the velocity where it will be operating or it is at the operating velocity. Therefore, if the circuit 200 was in closed loop mode, the BEMF ripple would propagate through the circuit 200 and would adversely affect the operation of the motor 110. In some embodiments of the circuit 200, only the first and second modes are used.

A third mode of operation occurs when the BEMF is between the low threshold $TH_{LO}$ and the high threshold $TH_{HI}$ and the error is positive as shown in decision block 312. This is sometimes referred to as a hysteresis mode. In this mode, the operation of the circuit 200 does not change as described in block 314. For example, if the circuit 200 is in open loop mode, it will stay in open loop mode until the BEMF goes below the low threshold $TH_{LO}$. Then the circuit 200 will enter the closed loop mode or the first mode of operation. If the circuit 200 was in the closed loop or first mode of operation and the error is positive, the circuit 200 will remain in the closed loop mode of operation until the BEMF exceeds the high threshold $TH_{HI}$. The hysteresis of the third mode of operation prevents the circuit 200 from oscillating between the open loop and closed loop modes by delaying the change of the operating mode.

A fourth operating mode is used for braking or stopping the motor 110. In the fourth mode of operation, the error is less than zero meaning that the velocity of the motor 100 exceeds the intended velocity based on the voltage at the input 116 as shown in decision block 318. In the fourth mode of operation, the circuit 200 enters the closed loop mode as shown in block 320. The ripple due to the closed loop operation is not relevant because the motor 110 is being slowed or stopped. In some embodiments, the feedback amplifier 154 will apply a voltage to the output driver 114 that will reverse the direction of the motor 110 in order to induce faster braking.

The circuit 200 drives the motor 110 hard for a fast acceleration in the closed loop mode. When the motor 110 is close to its intended operating velocity, the circuit 200 enters the open loop mode where the feedback is removed. Therefore, the motor 200 can operate at its intended velocity without the ripple on the BEMF propagating through the circuit 200.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A circuit for driving an Eccentric Rotating Mass ("ERM") motor, the circuit comprising:
   an input terminal;
   a driver having an input and an output;
   a feedback amplifier having an input coupled to the output of the driver, and an output;
   a summer circuit having first and second inputs, the first input coupled to the input terminal, the summer circuit further having an output coupled to the input of the driver;
   a first switch having a first terminal coupled to the first input of the summer circuit, and a second terminal coupled to the output of the summer circuit;
   a second switch having a first terminal coupled to the output of the feedback amplifier, and a second terminal coupled to the second input of the summer circuit; and
   a controller having a first input coupled to the output of the driver, a second input coupled to the input terminal, and an output coupled to respective control inputs of the first and second switches,
   wherein the controller is configured to receive an input signal from the input terminal, and a back electromechanical force (EMF) signal from the motor,
   wherein the controller is configured to operate the circuit in a closed loop mode when the back EMF signal is less than a lower threshold value and a difference between a value of the input signal and the back EMF signal is positive,
   wherein the controller is configured to operate the circuit in an open loop mode when the back EMF signal is greater than a higher threshold value and the difference between the value of the input signal and the back EMF signal is positive,
   wherein the controller is configured to operate the circuit in a previous one of the open loop and closed loop modes when the back EMF signal is between the higher and lower threshold values and the difference between the value of the input signal and the back EMF signal is positive,
   wherein the controller is configured to operate the circuit in the closed loop mode when the difference between the value of the input signal and the back EMF signal is negative,
   wherein the controller is configured to operate the circuit in the closed loop mode by opening the first switch and closing the second switch, and
   wherein the controller is configured to operate the circuit in the open loop mode by closing the first switch and opening the second switch.

2. The circuit of claim 1, wherein the feedback amplifier is connectable between the ERM motor and the driver for the motor.

3. The circuit of claim 2, wherein the feedback amplifier is disabled during the open loop mode.

4. The circuit of claim 2, wherein the feedback amplifier feeds back the back EMF signal, and wherein the circuit uses the back EMF signal as a drive signal for the motor.

5. The circuit of claim 1, further comprising an input amplifier having an input coupled to the input terminal and an output coupled to the first input of the summer circuit.

6. The circuit of claim 5, wherein the output of the input amplifier is connected to the input of the driver via at least one of the first switch and the summer circuit.

7. The circuit of claim 1, further comprising an input amplifier, wherein the input terminal is connected to the input amplifier and wherein a gain of the input amplifier varies depending on whether the circuit is operating in the closed loop mode or the open loop mode.

8. The circuit of claim 1, wherein the lower threshold is proportional to a maximum back EMF multiplied by a first constant.

9. The circuit of claim 1, wherein the upper threshold is proportional to a maximum back EMF multiplied by a second constant.

10. A method for operating an Eccentric Rotating Mass ("ERM") motor, the method comprising:
    operating, with a controller, a driver circuit for the motor in a closed loop mode when a back electromechanical force (EMF) signal from the motor is less than a lower threshold value and a difference between a value of an input signal and the back EMF signal is positive;
    operating, with the controller, the driver circuit in an open loop mode when the back EMF signal is greater than a higher threshold value and the difference between the value of the input signal and the back EMF signal is positive;
    operating, with the controller, the driver circuit in a previous one of the open loop and closed loop modes when the back EMF signal is between the higher and lower threshold values and the difference between the value of the input signal and the back EMF signal is positive;
    operating, with the controller, the driver circuit in the closed loop mode when the difference between the value of the input signal and the back EMF signal is negative; and
    wherein the driver circuit includes a summer circuit coupled between an input terminal of the driver circuit and an input of a driver, a feedback amplifier having an input coupled to an output of the driver, a first switch coupled between a first input of the summer circuit and an output of the summer circuit, and a second switch coupled between an output of the feedback amplifier and a second input of the summer circuit, wherein operating the driver circuit in the closed loop mode includes opening the first switch and closing the second switch, and wherein operating the driver circuit in the open loop mode includes closing the first switch and opening the second switch.

11. The method of claim 10, further comprising changing a gain of an input amplifier depending on the operational mode of the driver circuit.

12. A circuit for driving an Eccentric Rotating Mass ("ERM") motor, the circuit comprising:
    an input terminal;
    a driver having an input and an output;
    a feedback amplifier having an input coupled to the output of the driver, and an output;
    a summer circuit having first and second inputs, the first input coupled to the input terminal, the summer circuit further having an output coupled to the input of the driver;
    a first switch having a first terminal coupled to the first input of the summer circuit, and a second terminal coupled to the output of the summer circuit;

a second switch having a first terminal coupled to the output of the feedback amplifier, and a second terminal coupled to the second input of the summer circuit; and a controller having a first input coupled to the output of the driver, a second input coupled to the input terminal, and an output coupled to respective control inputs of the first and second switches.

\* \* \* \* \*